Feb. 4, 1964

T. C. KINCAID 3,120,491

WATER FILTER FOR FARM POND

Filed Sept. 8, 1960

INVENTOR.
Thomas C. Kincaid

BY Christy, Parmelee, Strickland
His Attorneys

Feb. 4, 1964 T. C. KINCAID 3,120,491
WATER FILTER FOR FARM POND
Filed Sept. 8, 1960 2 Sheets-Sheet 2

INVENTOR.
Thomas C. Kincaid
BY
Christy, Parmelee & Strickland
His Attorneys

United States Patent Office 3,120,491
Patented Feb. 4, 1964

3,120,491
WATER FILTER FOR FARM POND
Thomas C. Kincaid, P.O. Box 2047, Wintersville, Ohio
Filed Sept. 8, 1960, Ser. No. 54,682
5 Claims. (Cl. 210—242)

This invention relates to water filters and especially to filters designed to filter at the source and particularly water taken from so-called ponds and small bodies of water where there is little or no appreciable flow and conditions are favorable to stagnation of the water.

The invention has for its object to provide means for removing water from such a source at a level where the water is most potable and most free of living or dead vegetation and silt, and to filter the water at the level of removal. This not only assures the removal of the best available water, but minimizes the frequency at which it is necessary to clean or service the filter.

A further important object of the invention is to provide a filter which is buoyed at the desired level in the pond, and which is of simple construction, which is easy to handle and service, and which is not likely to be injured by ice.

It has heretofore been determined by research, aided with the use of apparatus provided by me, that water removed at a level somewhat below the surface of a farm or similar pond, but well above the bottom, is most consistently desirable from the standpoint of clarity or freedom from turbidity, living organisms, decaying vegetation, and odor. This, it has been determined, is due to a number of conditions. These ponds are generally exposed to sunlight, or at least sufficient light, and the water is sufficiently quiet to induce an abundant growth of green algae. This has conflicting results. The algae, being vegetable, produce chlorophyll and release oxygen into the water, but this activity is confined mostly to the top few inches of the pond. The oxygen has a purifying and deodorizing property which is beneficial, but the algae produces a green coloration in the water and would tend to clog a filter. The algae dies, and as it dies it sinks and goes to the bottom with leaves and other waterlogged organic material. This material, constantly undergoing decay, and along with silt and suspended solids, imparts turbidity to the quiet water at the bottom and releases odor characteristic of muck removed from the bottom of the pond. Beginning about eighteen inches below the surface and extending from there down for a distance which varies according to the depth of the pond, but which in a shallow pond may be for the next foot or two, the water has a maximum clarity, freedom from living or dead organic matter and silt, and is most potable and free of offensive odor, and at this level it is also most free of objectionable animal organisms such as plakton and other microscopic or near-microscopic pond life.

Consequently the water at this level, excluding conditions immediately during or following heavy rains, has the best quality and produces minimum deposit in the filter. The present invention is concerned with the filtering and removal of water at this level.

My invention may be more fully understood by reference to the accompanying drawings, in which.

Figure 1:
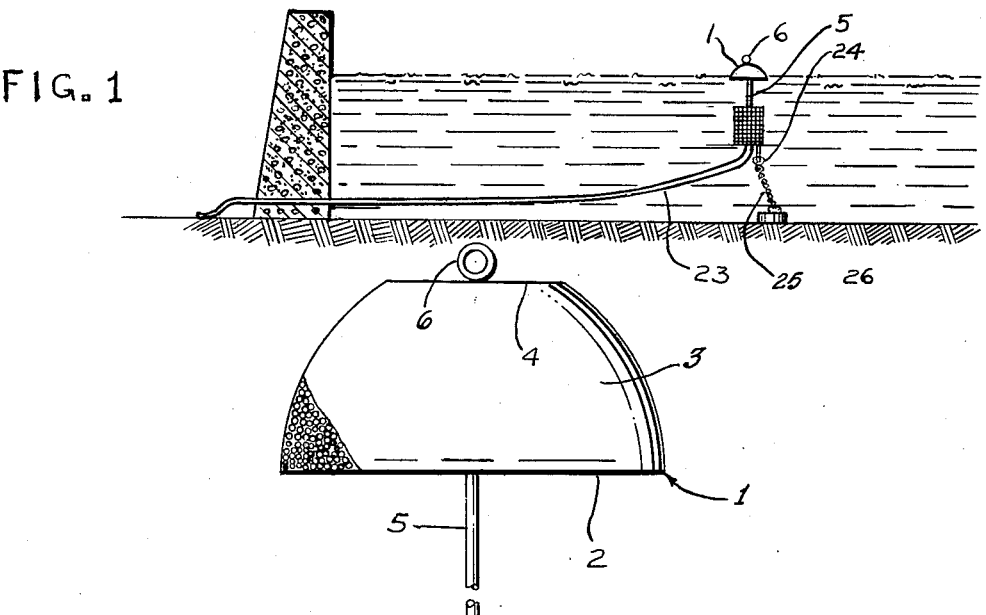
FIG. 1 is a side elevation, partly in section and partly in outline, of a typical farm pond to which a filter device embodying my invention is applied.
Figure 2:
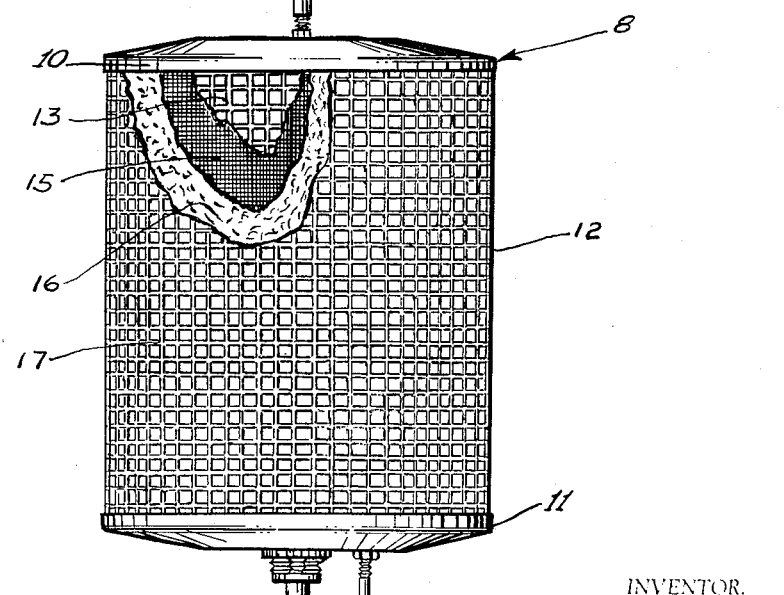
FIG. 2 is an enlarged elevational view, mainly in outline and partly in section, of the filter device shown in FIG. 1.
Figures 3, 4:
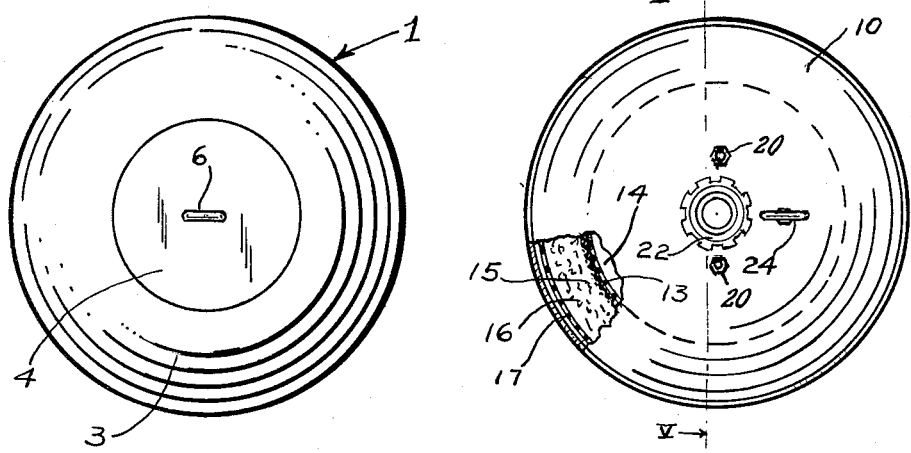
FIG. 3 is a plan view, in outline, of the device shown in FIG. 2.
FIG. 4 is a bottom view, mainly in outline and partly in section, in the plane of line IV—IV of FIG. 2.
Figure 5:
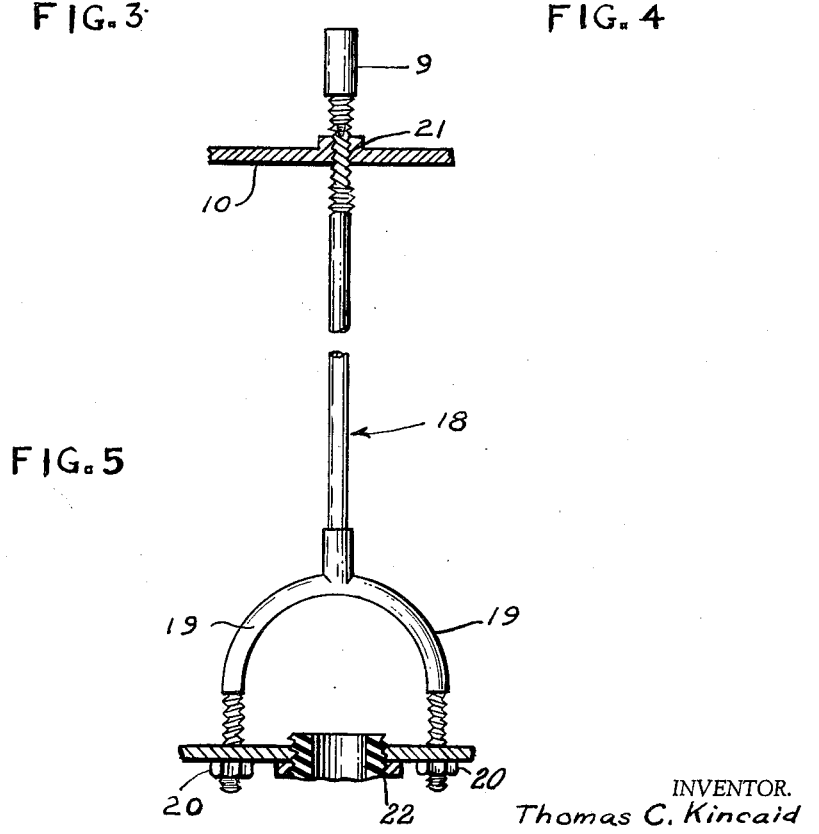
FIG. 5 is an enlarged fragmentary view, partly in section and partly in outline, showing the parts by which the strainer is held together.

According to the present invention there is provided a filter suspended from a float or buoy at a level below the surface relatively free of algae and well above the level of the bottom, the assembly being anchored to prevent drifting, and provision made for the withdrawal of water through the filter by means of a flexible tubing.

The float or buoy, designated generally as 1, is of a substantially hemispherical shape, having a flat bottom 2 of maximum diameter, upwardly-convergent convexly-curved sides 3, and a flat top 4. The body of the buoy is formed of a foamed plastic, which, while rigid, is comprised of innumerable small cells or bubbles, so that it is of light weight, easily handled, and has a low bulk density so as to be highly buoyant. It is covered with a continuous skin or shell of a denser, tougher material. The body of the float may be formed, for example, of foamed poly-urethane resin, or preferably of tiny bonded plastic bubbles which are available, and which can be united into a unitary mass of connected bubbles by heating them in a mold, this forming a tougher, more durable and more buoyant body than a so-called foamed plastic. The skin or shell may be a coating material that is cured in situ on the foamed body. It may be polyester resin, epoxy resin, vinyl acetate or similar tough, non-adsorbent smooth material.

The shape of the buoy is material first because when ice forms on the pond, the pressure of the ice against the convexed sides creates a downward component of force tending to depress the buoy and relieve the pressure against it. Because of its upwardly-decreasing volume, the displacement per unit of downward movement decreases, so that as ice forms, the buoyant force resisting submergence increases less rapidly than with a body of upwardly-increasing dimensions or of uniform horizontal section. Being of greatest diameter at the bottom, it gives a maximum area of shade for the most hours of the day in the area beneath it, so as to discourage the growth of algae in the region immediately beneath it, as compared to a float which increases upwardly in section. The curved sides and upwardly-decreasing section reduce the effect of wind, and because of the greater volume of the buoy being submerged, small waves encountered on a pond have the least effect in creating agitation by the constant bobbing up and down of the buoy and its filter and anchor chain.

The cellular body of the float can be cheaply molded, and even though it be punctured by accident or by irresponsible persons with guns to whom a floating buoy seems to present an irresistable target, it will remain afloat, although it may be quite badly damaged.

Passing axially through the float is an eye bolt 5, having an eye or finger loop 6 at the top and a threaded lower end 7. The filter unit, designated generally as 8, is connected with and suspended from the eye bolt by a connector 9 screwed onto the lower end of the bolt. The eye-bolt is preferably bonded into the plastic float when the float is being molded so as to avoid any condition where a bolt passing loosely through the plastic might cause chaffing of the plastic.

The filter comprises an upper circular end plate 10 with a downwardly-turned peripheral flange and a lower end plate 11 with an upwardly-turned peripheral flange. These plates, with their flanges, confine between them the cylindrical filtering medium designated generally as 12.

The filtering medium comprises a cylindrical inner core 13 of coarse, stiff screen of about a quarter inch mesh of the type often referred to as hardware cloth, and it provides within it a central chamber 14. This is encircled by a more flexible fine mesh screen 15, which may be of the order of $\frac{1}{16}$ inch mesh. Around this is wrapped a dense mat 16 of felted fiberglass forming the principal filtering medium. The mat is relatively thick, being preferably of an inch or more in thickness. Outside the mat and holding it in position is a cylindrical enclosure 17 which is of stiff, coarse wire mesh similar to core 13. The principal purpose of the stiff screens 13 and 17 is to provide a rigid water-pervious structure for confinng and supporting the fine mesh screen and matted fibers and giving rigid form to the structure between the end plates.

The ends of the columnar assembly so provided are fitted inside the flanges of the end plates 10 and 11, and the structure is held together by a central tie rod 18 having a bifurcated or yoke-like lower end with threaded branches 19 passing through spaced holes in the bottom plate 11. At the lower protruding ends of these branches are confining nuts 20. The upper end of the rod 18 is threaded through a central opening at 21 in the top plate, so that by turning the top plate, or taking up on the bottom nuts 20, the filtering column can be tightly compressed between the end members. The coupling 9 is screwed onto the upper protruding end of this rod.

At the center of the bottom plate is sealed an outlet connection 22, to which is attached a flexible tube 23 that may lead to a pipe (not shown), connected to a pump, or through which there may be gravity flow to a point where the water is to be used.

The bottom plate 11 also has an eye-bolt 24 screwed into it and depending therefrom at one side of the center. A flexible mooring line or chain 25 connects to the eye and to an anchor 26 at the bottom of the pond, this line or chain having some slack to allow for the change of water level, but not sufficient to allow much drifting about of the float.

The eye-bolt 5 is of such length that the top of the filter is approximately eighteen inches below the surface of the water, and the filter, rigidly suspended and centered below the float, preferably does not exceed the diameter of the float. The glass fiber in the filter is non-adsorbent, so that its weight does not increase when it becomes wet, and when it becomes contaminated with organic matter, it may be washed, in some cases by reverse flushing, but preferably by removal. The fine mesh screen obstructs the flow of loose glass fibers or fragments and tends to confine the glass mat in such manner as to avoid channeling of the water through the mat, that is, opening up in the mat relative large free passages for the flow of water therethrough.

The float and filter unit is relatively light and not too bulky for easy handling, even after it has been in the water for a long period of time. To remove the glass fiber mat to clean or replace it, the two nuts at the bottom may be removed, and the strainer assembly may then be easily taken apart and reassembled with clean glass fiber mat material in place. The entire apparatus is inexpensive, and the filter is buoyed at a level where the top of the filter is about eighteen inches below the surface of the water, and the filter unit is preferably from twelve to sixteen inches in height, so that the water is always withdrawn from the most desirable level in the pool.

I claim:

1. A filter assembly for removing water from below the surface and above the bottom of a farm pond at a level where the quality of the water is normally best and quantity of filterable substances the least; comprising a buoy, a rigid rod extending downwardly from the buoy at its center, a cylindrical filter unit detachably secured to the lower end of the rod extending with its axis in line with the rod and spaced below the buoy, the filter having separable closed top and bottom end members and a water-pervious cylindrical external wall, a hollow cylindrical straining medium concentrically positioned within and surrounded by said water-pervious wall through which the water may flow from the exterior to the interior of the hollow cylindrical straining medium, the ends of the cylindrical wall being closed by and clamped between said top and bottom end members, and outlet means centered in the bottom end member and extending downwardly therefrom to provide a nipple to which tubing may be attached for withdrawing water from the interior of the cylindrical wall and straining medium, the buoy and rod being proportioned to sustain the top of the filter about eighteen inches below the surface of the water when the buoy is floating.

2. A filter assembly as defined in claim 1 in which the rod has an extension that passes axially through the filter, the upper end member being carried on said rod extension, the rod extension having a bifurcated lower end with the two arms thereof passing through the bottom end member, the arms being equidistantly spaced from said central outlet means, and retaining nuts on the ends of the arms below the extension to enable the bottom end member to be removed for replacement of the water-pervious cylindrical wall, said rod extension being threaded at its upper end, the top end member being screwed on to said threaded upper end of the rod into contact with the top of the cylindrical wall and straining medium.

3. A filter assembly as defined in claim 1 in which the rod has an extension that passes axially through the filter, the upper end member being carried on said rod extension, the rod extension having a bifurcated lower end with the two arms thereof passing through the bottom end member, and retaining nuts on the ends of the arms below the extension to enable the bottom end member to be removed for replacement of the water-pervious cylindrical wall, the extension being secured to the rod through a separable coupling to enable the top end member to be removed, said rod extension being threaded at its upper end, the top end member being screwed onto said threaded upper end of the rod into contact with the top of the cylinder.

4. A filter assembly as defined in claim 1 in which the cylindrical external wall is formed of stiff wire netting and the hollow cylindrical straining medium comprises a glass fiber mat in cylindrical form, a cylinder of fine wire mesh fitted inside the glass mat and a cylinder of stiff wire netting inside the fine wire mesh and confining the glass mat and fine wire mesh inside the said outer cylinder.

5. A floating filter of the class described comprising a float, a filter, and an elongated connector in the form of a rod passing through the center of the float rigidly attaching the filter to the float at a fixed distance therebelow, the float being formed of cellulated plastic having a rigid core for attachment to said connector and being of upwardly decreasing diameter with convex sides, the filter comprising an upper end plate and a lower end plate, an outer cylindrical screen and an inner cylindrical screen disposed between said end plates in concentric relation to each other to thereby define an open central chamber, a replaceable filtering element disposed between said screens in concentric relation thereto, and a screw-threaded tie rod supporting said bottom plate and said top plate so as to clamp said screens in their concentric relation and connecting said filter to said connector so that the upper end plate closes the upper end of said central chamber, and a centered outlet nipple secured to and passing through the lower end plate and depending therefrom.

References Cited in the file of this patent

UNITED STATES PATENTS

| | | |
|---|---|---|
| 222,977 | Long | Dec. 23, 1879 |
| 291,285 | Breese | Jan. 1, 1884 |
| 536,858 | Donato | Apr. 2, 1895 |
| 1,647,809 | Neumann | Nov. 1, 1927 |
| 2,765,275 | Aaron | Oct. 2, 1956 |
| 2,827,268 | Staaf | Mar. 18, 1958 |
| 2,883,345 | Taylor et al. | Apr. 21, 1959 |
| 2,905,327 | Phillips | Sept. 22, 1959 |

FOREIGN PATENTS

| | | |
|---|---|---|
| 7,212/32 | Australia | Apr. 27, 1933 |
| 29,224 | Great Britain | 1896 |